Patented Apr. 12, 1949

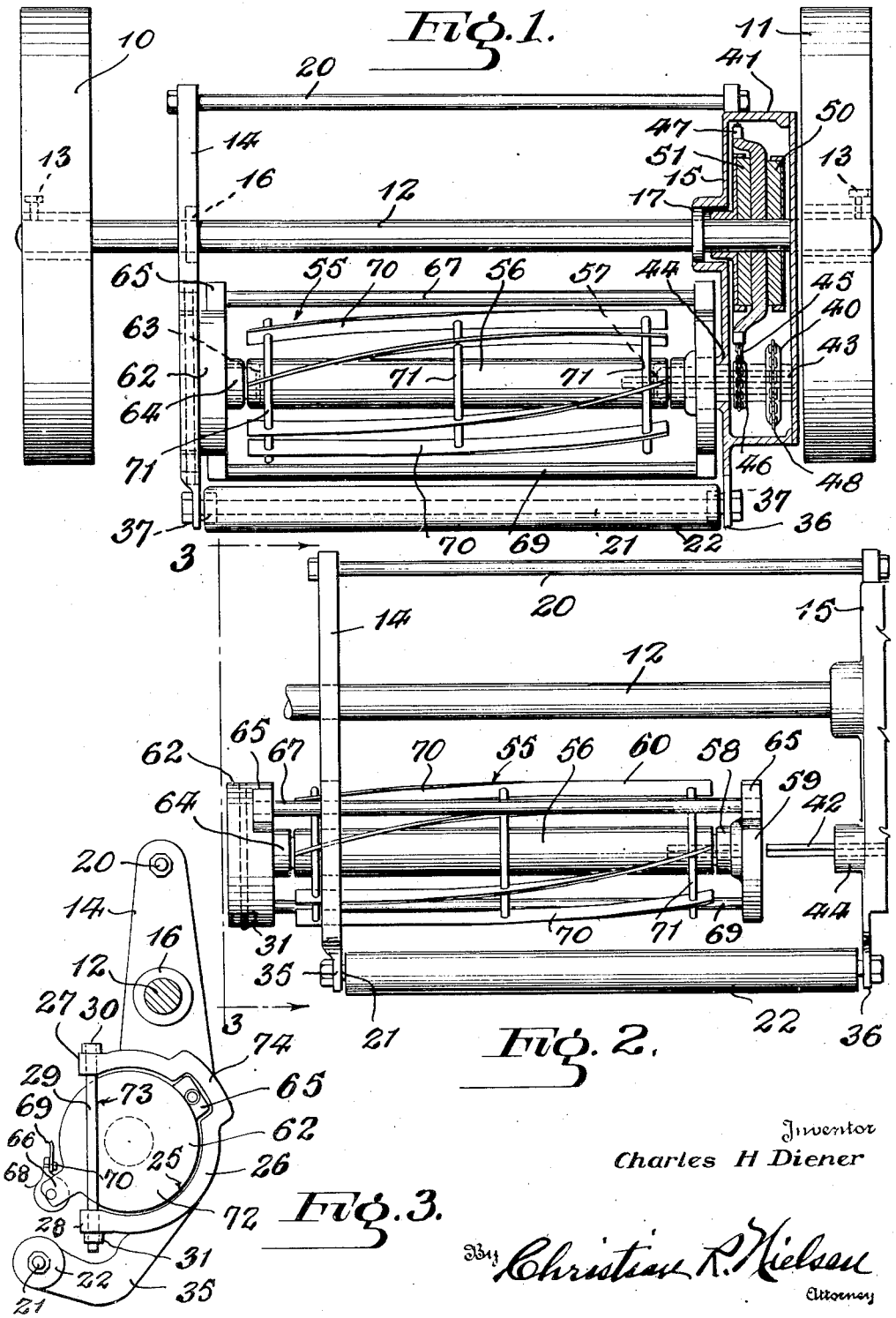

2,467,195

UNITED STATES PATENT OFFICE 2,467,195

LAWN MOWER

Charles H. Diener, Pottstown, Pa.

Application February 11, 1948, Serial No. 7,619

3 Claims. (Cl. 56—249)

This invention relates to lawn mowers. An object of the invention is the provision of a lawn mower having a unit which when damaged may be removed and readily replaced by a unit in good condition, the unit including an adjustable cutter blade and revolving spiral blades.

Another object of the invention is the provision of a lawn mower having a mower unit which when the various blades incorporated therein have become dull may be removed readily and replaced by a like unit having the blades properly sharpened, the units including an adjustable cutter blade and revolving spiral blades, said unit being held in place by a single clamping bolt.

A further object of the invention is the provision of a lawn mower in which a clamping member is adapted to maintain a removable unit in place on the mower, said unit including the usual adjustably mounted cutter blade and a removable reel provided with revolving spiral blades, the unit not only being held in place in the mower but being properly positioned by a tightening bolt for the clamping member on the mower frame and a cooperating straight shoulder on one end of the reel, the unit when damaged being readily replaceable by a like unit in workable condition.

The invention consists in the novel construction, arrangement and combinations of parts hereinafter more particularly described and claimed.

In the drawings:

Figure 1 is a plan view of a lawn mower partly in section and showing the improvements described herein.

Figure 2 is a fragmentary plan view of the mower showing a removable unit partly displaced with respect to the mower frame, and Figure 3 is a transverse vertical section of the mower taken along the line 3—3 of Figure 2.

Referring more particularly to the drawings, 10 and 11 designate traction wheels which are removably attached to a shaft 12 by set screws 13. Said shaft is journalled in intermediate portions of side bars 14 and 15, as shown at 16 and 17, respectively.

A rod 20 connects the forward ends of the side bars together. An axle 21 connects the rear ends of said side bars. The front rod 20 is at a higher horizontal level than the axle 21 since said axle is close to the ground where it supports a roller 22 and thus controls the vertical height of the rod 20.

The side bar 14 (Figure 3) has a semi-circular opening 25 and a bead 26 circumscribes said opening. The bead in effect is a clamp. The ends 27 and 28 of said bead are provided with passages where said ends project beyond one edge of the bar 14. A bolt 29 is received by said passages. A head 30 at one end of the bolt engages the projection 27 while a nut 31 threaded on the other end of said bolt tends to draw the projections toward each other for a purpose which will be presently explained.

The axle 21 carrying the roller 22 is supported at its ends by curved arms 35 and 36 projecting outwardly and downwardly from the rear portion of the respective side bars 14 and 15. While no adjustment for raising or lowering the roller 22 is shown, it will be appreciated that in practice, the well-known form of slotted sliding bars and bolts may be mounted on the respective arms 35 and 36 for that purpose. Roller bearings 37 are provided in the ends of the roller 22 as shown in dotted lines in Fig. 1.

A sprocket 40 is mounted in a housing 41 cast integrally with the side bar 15. Said sprocket is rotated by a motor (not shown) which is mounted on the frame of the mower. The sprocket drives a shaft 42 which is square in cross section and which has a bearing 43 on the housing 41 and a bearing 44 on the side bar 15. A chain 45 is driven by a second sprocket 46 and said chain drives a third sprocket 47 loose on the axle 12. The sprocket 46 has a square opening at its center for receiving the shaft 42. The motor-driven chain is shown at 48.

A right-hand clutch 50 is slidably keyed to the shaft 12 while a left-hand clutch 51 is slidably keyed to said shaft. The clutches and the sprocket 47 are located in the housing 41 with the clutches at opposite faces of the sprocket 47. The usual yoke and lever (not shown) are provided in practice for moving the clutches into operative relation with the sprocket 47.

The above description relates to a supporting and operating unit. The following description will set forth the features of a removable unit carrying the usual straight cutter bar and a reel provided with spiral blades cooperating with the cutter bar for mowing grass.

The removable unit generally designated by the numeral 55 has a hollow shaft 56 which is provided with a longitudinal axial passage, square in cross section, for receiving the free end of the shaft 42 whereby the shaft 56 will be revolved when the sprocket 40 is rotated. One end of the shaft 56 is supported by tapered roller bearings 57 carried by a hollow boss 59 on one end of a reel 60 of the unit 55. The boss fits into a hollow sleeve 61 projecting from the inner face of the side bar 15.

The other end of the hollow shaft 56 adjacent a disk 62 at the other end of the reel 60 contains an outer bearing race 63 for tapered roller bearings. A boss 64 forms a projection on the inner face of the disk 62 and on the projection are placed the inner race and rollers of the tapered bearings of the reel.

The disks 59 and 62 have diametrically disposed lugs 65 and 66. A brace rod 67 is rigidly connected between the lugs 65 of both disks 59 and 62. A bar 68 is connected between the lugs 66 of said disks. A cutter bar 69 is adjustably positioned and held in place on the bar 68 by bolts 69' which are threaded into openings in the supporting bar 68. The supporting bar is provided with the usual fulcrum screws (not shown) for properly positioning the cutting edge of the cutter 69 with respect to the spiral blades 70 of the reel.

Spaced webs 71 are welded or cast integrally with the opposite ends of the shaft 56 and with an intermediate portion of said shaft. The spiral blades have their ends and intermediate portions welded or otherwise secured to adjacent points on the webs.

The outer face of the disk 62 is cut away at 72 to provide a straight shoulder 73 which is in close contact with the rod 29 for retaining the unit 55 in such a position that the blade or cutter bar 69 will be held in a substantially horizontal position for the proper cutting of the grass.

The side bar 14 adjacent the member 26 has an arch 74 through which the lugs 65 may be passed when the unit 55 is removed. It is necessary to release a fastening means before the unit may be removed.

When the blade 69 and the spiral cutters 70 have become dull the unit 55 is removed from the mower and replaced by a reconditioned unit. Before this can be accomplished, however, the traction wheel 10 is removed by loosening the set screw 13 to provide clearance for the unit 56. The nut 31 is then unscrewed from the bolt 29 to permit withdrawal of said bolt. The unit 55 is shifted to the left (Fig. 2) and completely removed from the mower. The new unit is then shifted into place and the bolt 29 and the wheel 10 are restored to their respective positions in the construction.

The removable cutting unit 55 may be replaced by a reconditioned unit at the local dealer's establishment. Where a great number of mowers is employed, the owner of the fleet may carry in stock a sufficient number of new units or reconditioned units for ready replacements in order to maintain the fleet in readiness at all times. The dull units having been exchanged at the local dealer are returned by him to the factory for repair.

The removable units eliminate the necessity of transporting the entire mower to a repair shop. The simple manually operated lawn mower is quite heavy and cumbersome while the power-operated mower is not only cumbersome but in many instances too heavy for lifting by the average person. Thus it will be seen that the removable unit which may be released easily from its attachment with the mower and readily transported in a passenger automobile, is light and compact and may be handled by a boy.

What I claim:

1. A lawn mower having traction wheels and a frame including side bars, a mower unit removably mounted on the side bars of the mower frame, said unit comprising spaced circular plates, a reinforcing bar and a cutter bar connecting the plates together at diametrically opposite points, a reel having spiral blades at the periphery thereof rotatably mounted on and between the plates so that the spiral blades will be revolved in close cutting relation with the cutter bar, one of the side bars having an opening through which the unit may be withdrawn, one of the side plates having a straight shoulder at the outer face thereof, a clamp embracing the opening in the first-mentioned side bar and receiving the first mentioned side plate, a bolt in engagement with the shoulder and carried by the clamp for drawing the ends of the clamp tight on the side plate, means on the other side bar of the mower frame for supporting the other side plate and operative connections between the reel and the traction wheels.

2. A lawn mower having traction wheels and a frame including side bars, a mower unit removably mounted on the side bars of the mower frame, said unit comprising spaced circular plates, a reinforcing bar and a cutter bar connecting the plates together at diametrically opposite points, a reel having spiral blades at the periphery thereof rotatably mounted on and between the plates so that the spiral blades will be revolved in close cutting relation with the cutter bar, one of the side bars having an opening through which the unit may be withdrawn, one of the side plates having a straight shoulder at the outer face thereof, a clamp embracing the opening in the first-mentioned side bar and receiving the first mentioned side plate, a bolt in engagement with the shoulder and carried by the clamp for drawing the ends of the clamp tight on the side plate, means on the other side bar of the mower frame for supporting the other side plate and operative connections between the reel and the traction wheels, said operative connections including a removable shaft which has a sliding engagement with the reel.

3. A lawn mower having traction wheels and a frame including side bars, a mower unit removably mounted on the side bars of the mower frame, said unit comprising spaced circular plates, a reinforcing bar and a cutter bar connecting the plates together at diametrically opposite points, a reel having spiral blades at the periphery thereof rotatably mounted on and between the plates so that the spiral blades will be revolved in close cutting relation with the cutter bar, one of the side bars having an opening through which the unit may be withdrawn, a clamp embracing the opening in the side bar and adapted to receive one of the side plates of the mower unit, means drawing the clamp tight on said side plate, means on said side plate cooperating with the drawing means for properly positioning the mower unit in the mower frame, means on the other side bar supporting the other side plate of the mower unit, and means removably and operatively connecting the reel with the traction wheels.

CHARLES H. DIENER.

REFERENCES CITED

The following references are of record in the file of this patent:

UNITED STATES PATENTS

| Number | Name | Date |
|---|---|---|
| 1,043,507 | Coldwell | Nov. 5, 1912 |
| 2,283,161 | Booton | May 19, 1942 |
| 2,372,300 | Speiser | Mar. 27, 1945 |